US008861932B2

(12) United States Patent
Shaw et al.

(10) Patent No.: US 8,861,932 B2
(45) Date of Patent: Oct. 14, 2014

(54) VIDEO SERVICE BUFFER MANAGEMENT

(75) Inventors: Venson Shaw, Kirkland, WA (US); Jun Shen, Redmond, WA (US)

(73) Assignees: AT&T Mobility II LLC, Atlanta, GA (US); AT&T Intellectual Property I, LP, Atlanta, GA (US)

(*) Notice: Subject to any disclaimer, the term of this patent is extended or adjusted under 35 U.S.C. 154(b) by 24 days.

(21) Appl. No.: 13/474,895

(22) Filed: May 18, 2012

(65) Prior Publication Data

US 2013/0308919 A1 Nov. 21, 2013

(51) Int. Cl.
*H04N 5/92* (2006.01)
(52) U.S. Cl.
USPC .......................................... 386/248; 386/239
(58) Field of Classification Search
None
See application file for complete search history.

(56) References Cited

U.S. PATENT DOCUMENTS

| 6,310,857 | B1 | 10/2001 | Duffield et al. |
| 6,876,666 | B1* | 4/2005 | Engdahl ........................ 370/466 |
| 7,051,110 | B2 | 5/2006 | Hagai et al. |
| 7,581,019 | B1 | 8/2009 | Amir et al. |
| 7,630,612 | B2* | 12/2009 | Kent et al. ...................... 386/344 |
| 7,657,672 | B2 | 2/2010 | Kampmann et al. |
| 7,779,443 | B2 | 8/2010 | Kim |
| 7,840,693 | B2 | 11/2010 | Gupta et al. |
| 7,952,998 | B2 | 5/2011 | Gregg et al. |
| 8,032,676 | B2 | 10/2011 | Wingard et al. |
| 8,045,469 | B2 | 10/2011 | Nagy et al. |
| 8,099,755 | B2 | 1/2012 | Bajpai et al. |
| 2007/0223586 | A1* | 9/2007 | Nagai et al. .............. 375/240.13 |
| 2010/0098047 | A1 | 4/2010 | Zhou et al. |
| 2013/0336635 | A1* | 12/2013 | Randall .......................... 386/248 |

* cited by examiner

*Primary Examiner* — William C Vaughn, Jr.
*Assistant Examiner* — Eileen Adams
(74) *Attorney, Agent, or Firm* — Guntin & Gust, PLC; Joseph Hrutka

(57) ABSTRACT

A system that incorporates teachings of the subject disclosure may include, for example, receiving video content at a communication device, providing the video content to a video buffer of the communication device, commencing playback of the video content at the communication device, determining buffer status information that represents a capacity of the video buffer and an amount of the capacity that has been utilized, monitoring for a buffer exhaustion condition based on the buffer status information, and adjusting the playback of the video content responsive to a detection of the buffer exhaustion condition. Other embodiments are disclosed.

18 Claims, 6 Drawing Sheets

500

600

VIDEO SERVICE BUFFER MANAGEMENT

FIELD OF THE DISCLOSURE

The subject disclosure relates generally to media services and more specifically to video service buffer management.

BACKGROUND

There are numerous video services developed for networks, including mobile networks. Mobile devices can be provided with more powerful central processing unit chips, larger memories, and more advanced video processing technology. Mobile data networks can be upgraded to newer and faster access technologies. However the video service quality area remains challenging to manage due to a mobile network's ever changing conditions resulted from its traffic fluctuation, coverage variation, and/or users' mobility.

BRIEF DESCRIPTION OF THE DRAWINGS

Reference will now be made to the accompanying drawings, which are not necessarily drawn to scale, and wherein.

DETAILED DESCRIPTION

Figure 1:
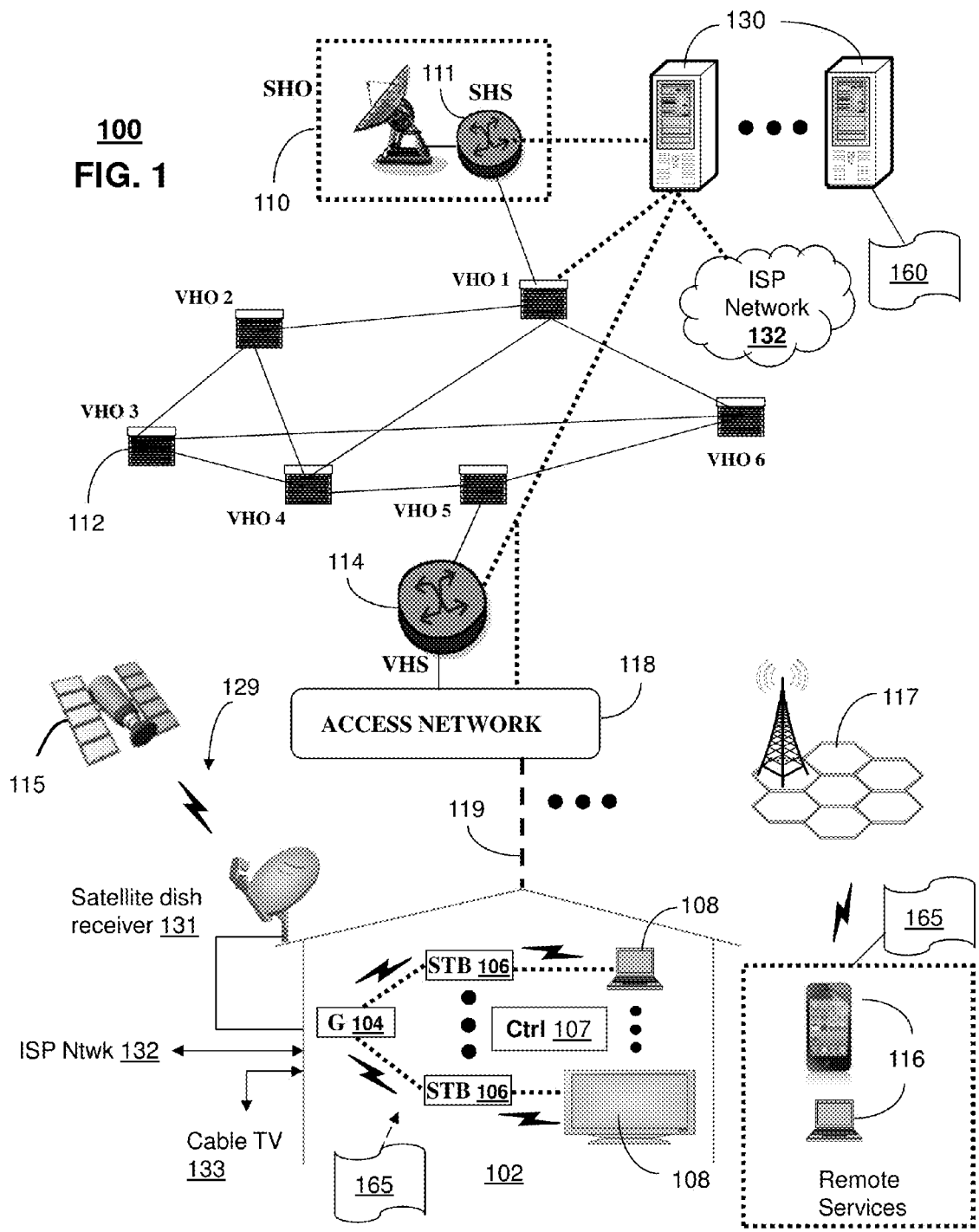
FIGS. 1-2 depict illustrative embodiments of communication systems that provide media services.

The subject disclosure describes, among other things, illustrative embodiments of managing transmission rate and encoding rate for video content based on a number of factors, including a status of the receiving video buffer and/or network conditions. In one or more embodiments, a receiving device can provide a buffer status to a transmitting device to facilitate adjustment by the transmitting and/or encoding device of the transmission rate and encoding rate. In one or more embodiments, both the receiving device and the transmitting device can participate in the management, such as the receiving device adjusting a frame rate for playback while the transmitting device adjusts a transmission rate. Other embodiments are contemplated by the subject disclosure.

One embodiment of the subject disclosure includes a communication device having a memory storing computer instructions and a processor coupled with the memory. The processor, responsive to executing the computer instructions, performs operations including receiving video content over a network from a content source device and providing the video content to a video buffer of the communication device. The operations include obtaining network condition information representing a network status and determining a playback start time based on the network condition information. The operations include commencing playback of the video content based on the playback start time and communicating buffer status information to the content source device to enable the content source device to adjust a transmission rate for the video content being received by the communication device based on the buffer status information and the network status. The buffer status information represents a capacity of the video buffer and an amount of the capacity that has been utilized.

One embodiment of the subject disclosure includes receiving video content at a communication device where the video content is received over a network from a content source device and providing the video content to a video buffer of the communication device. The method includes commencing playback of the video content at the communication device and determining buffer status information that represents a capacity of the video buffer and an amount of the capacity that has been utilized where the buffer status information is determined by the communication device. The method includes monitoring for a buffer exhaustion condition based on the buffer status information, where the buffer exhaustion condition is monitored by the communication device and comprises a determination that the video buffer will fall below a minimum threshold prior to the communication device receiving all of the video content. The method includes adjusting the playback of the video content responsive to a detection of the buffer exhaustion condition, where the adjusting of the playback is performed by the communication device. The adjusting of the playback includes generating duplicated frames from original frames of the video content and inserting the duplicated frames with the original frames in the video buffer.

One embodiment of the subject disclosure includes a non-transitory computer-readable storage medium comprising computer instructions which, responsive to being executed by a processor, cause the processor to perform operations including commencing encoding of video content to generate encoded video content and commencing transmitting of the encoded video content from the processor over a network to a communication device. The operations include obtaining network condition information representing a network status and receiving buffer status information from the communication device, where the buffer status information represents a capacity of a video buffer of the communication device and an amount of the capacity that has been utilized by the communication device. The operations include adjusting a transmission rate and an encoding rate for the video content being transmitted to the communication device by the processor based on at least one of the buffer status information or the network status.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, where a portion of the devices 130 can operate as a web server for providing web portal services over an Internet Service Provider (ISP) network 132 to wireline media devices 108 or wireless communication devices 116.

Communication system 100 can also provide for all or a portion of the computing devices 130 to function as a content source (herein referred to as source 130). The source 130 can use computing and communication technology to perform function 160, which can include among things, encoding and/or transmitting video data in a video stream to receiving devices such as mobile devices 116 and media processors 106. The media processors 106 and wireless communication devices 116 can be adapted with software functions 165 to utilize the services of source 130.

In one embodiment, source 130 can adjust transmission and/or encoding of the video content based on conditions associated with one or more of the network and a video buffer of the receiving devices. In another embodiment, receiving devices can adjust playback of the received video stream based on one or more of the network conditions and the video buffer conditions. As an example, the source 130 can increase the encoding and transmission rates responsive to detecting a lower network load but can decrease the encoding and transmitting rates responsive to detecting that the video buffer of a receiving device has reached a high water mark. As another example, the receiving device (e.g., mobile device 116 and/or set top box 106) can slow down the playback of the video content, such as through reducing a frame rate or inserting duplicate frames into the buffer so as to maintain the same frame rate.

It is further contemplated that in one or more embodiments, source 130 can be a mobile end user device providing video content to another end user device which may or may not be another mobile device. In this example, the source 130 can perform encoding or can utilize another device to perform the encoding, such as transmitting the video content to an intermediary device that formats the video coding into a desired format for delivery via the video stream to the receiving device. In this example, the intermediate device can initiate streaming of the video content to the receiving device after all of the video content is received from the source 130 or can begin the streaming while receiving the video content from the source. In another embodiment, the source 130 can be a video server (e.g., operated by a service provider) or other fixed communication device (e.g., a set top box).

System 100 can provide for buffer management that supports transmission rate change in conjunction with an encoding rate change. For instance, a video buffer of a receiving device, (e.g., mobile device 116) can have a number of parameters including a total buffer size and designated amounts of buffer usage. The receiving device 116 can provide buffer status information to the source 130 or another device that controls transmission rate and/or encoding rate for a video stream. The buffer status information can include the total buffer size, and/or the current used and/or unused capacity of the video buffer. An early detection point of the video buffer can be designated so that network conditions can be determined at this point. For example, the source 130 can determine that that video buffer has reached the early detection point based on buffer status information received from the receiving device 116. In response, network conditions can be obtained, such as via transmitting queries to a monitoring server and/or transmitting queries directly to one or more network elements (e.g., routers, switches and so forth). The particular network conditions that are obtained can vary and can include, network traffic or load, a history of network load corresponding to a transmission time for the video stream, and/or an identification of network element failure(s) that may impact the network. The particular value of the early detection point with respect to the capacity of the video buffer can be static or dynamic.

In one embodiment, when the video buffer of the receiving device 116 reaches a pre-determined amount before capacity, the source 130 can slow down or temporarily stop transmitting the video stream. In one embodiment, when the video buffer reaches a predetermined amount before being empty, the receiving device 116 can slow down the playback of the media content, such as utilizing a lower frame rate to delay buffer starvation and/or inserting duplicate frames (e.g., generated by the receiving device) into the video buffer so that the frame rate can be maintained at the same rate but the video buffer does not empty.

In one embodiment, a playback start time can be determined by one or both of the source 130 and the receiving device 575. The playback start time can be based on a number of factors including, a type of media content, network conditions, time of day, device capabilities, communication protocols being utilized, quality of service requirements, user preferences, buffer status information, buffer operational parameters and so forth. In one embodiment, the receiving device 116 can obtain network conditions in conjunction with requesting the video stream and can determine the playback start time based on the network conditions.

It is further contemplated that multiple forms of media services can be offered to media devices over landline technologies such as those described above. Additionally, media services can be offered to media devices by way of a wireless access base station 117 operating according to wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

Figure 2:
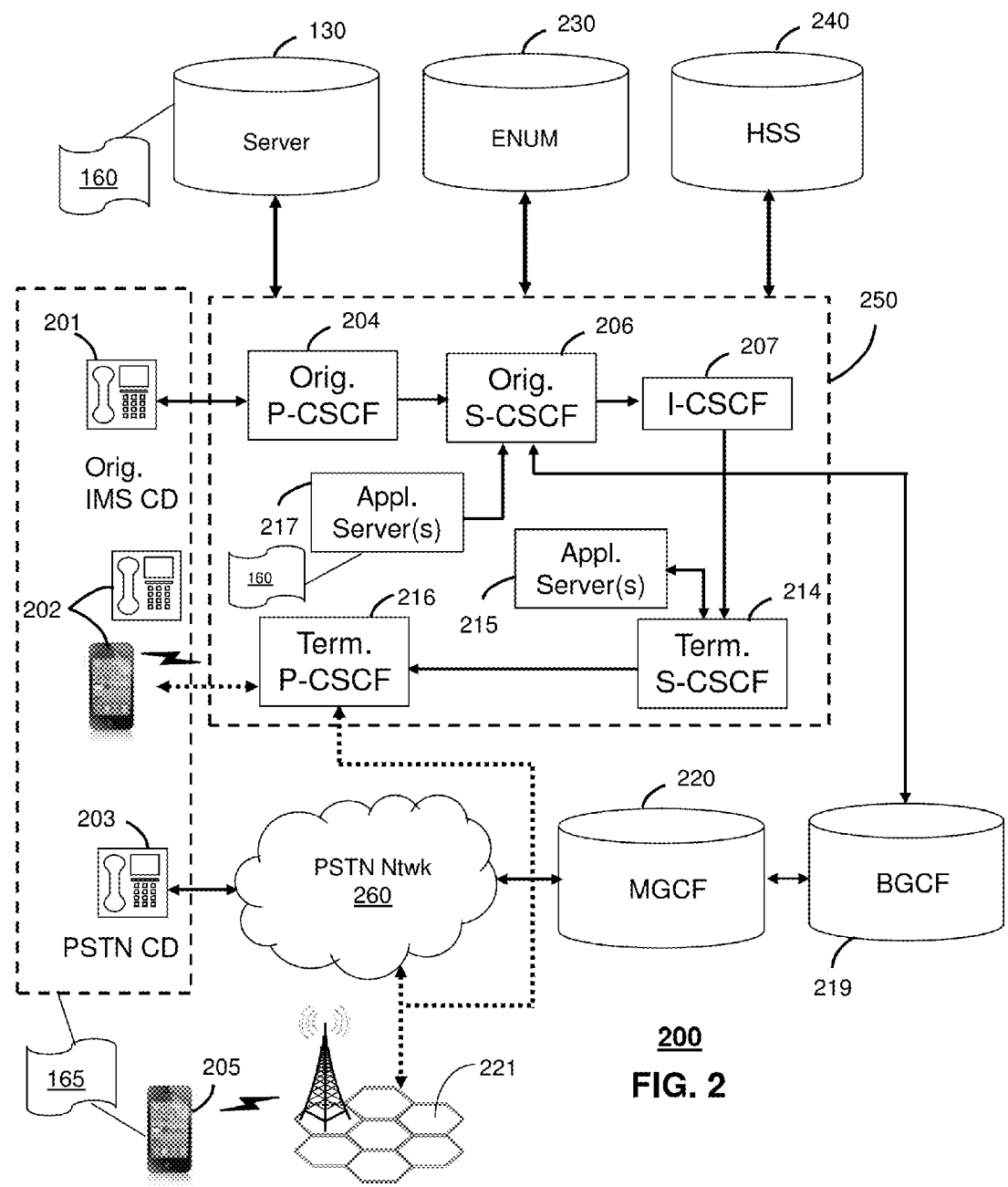

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100. Communication system 200 can enable the transmission of data between a source device and a recipient communication device according to the processes described herein that enable controlling or otherwise managing transmission rate, encoding rate and video buffer usage associated with video content services. This control can include adjusting transmission rate and/or encoding rate of video content on the fly based on a number of factors that can be communicated over system 200, such video buffer capacity and status, network load or status, and so forth.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The source 130 of FIG. 1 can be operably coupled to the second communication system 200 for purposes similar to those described above. It is further contemplated by the subject disclosure that source 130 can perform function 160 and thereby provide video buffer management services. As an example, encoding and transmission rates for video content being provided over system 200 to one or more of the CDs 201, 202, 203 and 205 can be dynamically adjusted based on other data that is being transmitted over the system 200, such as data associated with the present status of the video buffer of the receiving device, current or historical network status information including network load, user preferences and so forth. CDs 201, 202, 203 and 205, can be adapted with software to perform function 165 to utilize the services of the source 130 and to further manage the video buffer such as through frame rate adjustment or duplication of frames for insertion in the video buffer. It is further contemplated that the source 130 can be an integral part of the application server(s) 217 performing function 160, adapted to the operations of the IMS network 250.

Figure 3:
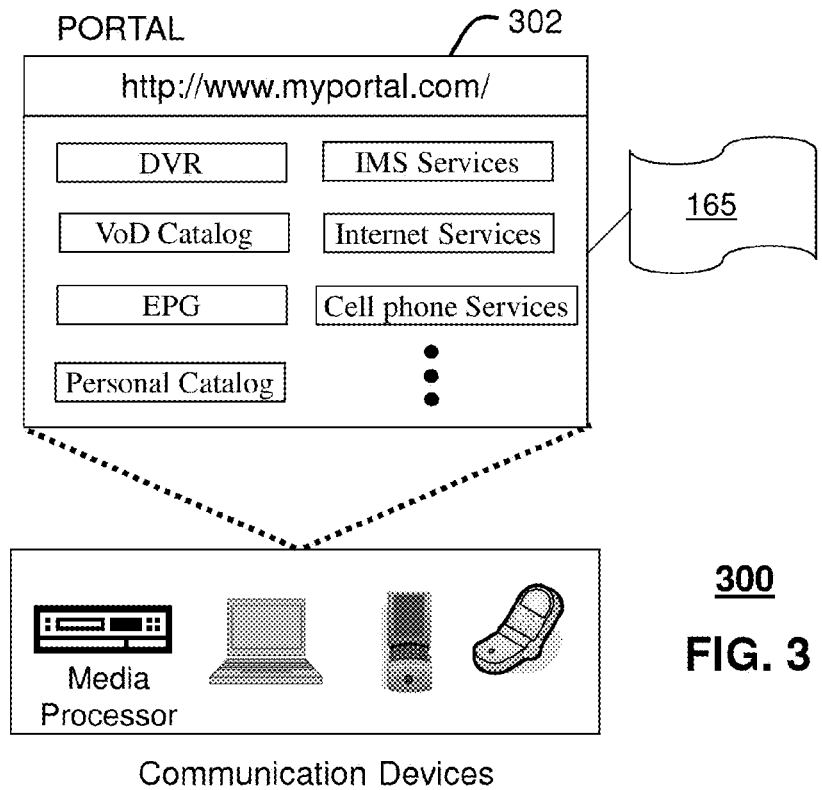
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software application 165 to adapt these applications as may be desired by subscribers and service providers of communication systems 100-200. As an example, video buffer management applications can be provisioned from the web portal to one or more receiving devices, to enable functions 165, including frame rate adjustment, network condition analysis, frame duplication, playback start time identification and so forth. Continuing with this example, the frame rate adjustment can be performed by the receiving device where the rate is selected based on number of factors including one or more of the present video buffer status, user preferences, type of media content, and so forth. In another embodiment, network data can be collected from one or more network elements, including elements along the path of the video stream for the video content, and the data can be analyzed to estimate or predict time of delivery, packet loss or other delivery parameters. These delivery parameters can be considered by one or both of the media source and the recipient device in adjusting transmission rate and/or encoding rate for the content and/or adjusting playback of the video content at the receiving device.

Figure 4:
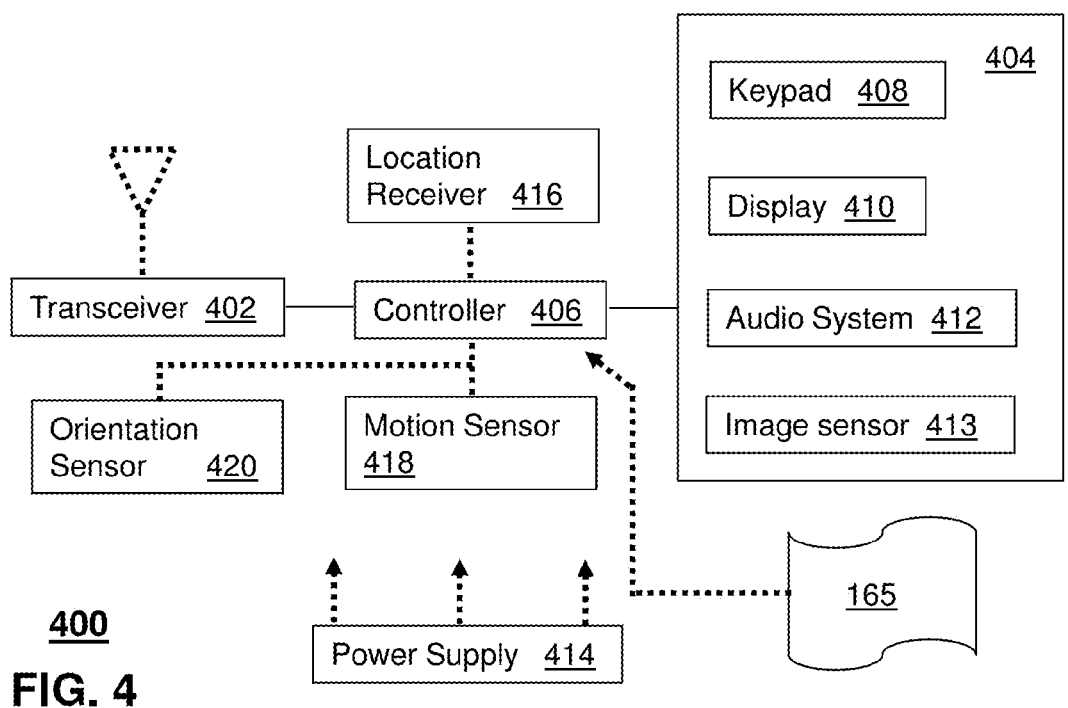
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 165. For example, the controller 406 can duplicate frames or a portion thereof and insert the duplicated data into the video buffer in anticipation of the video buffer being starved, such as if the transmission rate from the source 130 is not high enough to maintain frames in the video buffer. The duplication or copying process can be performed utilizing imaging techniques on a frame by frame basis and/or based on selected frames. For instance, certain frames may be flagged (e.g., via metadata) as frames that can be more easily copied or a better candidate for copying based on characteristics of the frame, such as the resolution, number of pixels illuminated, etc.

Figure 5:
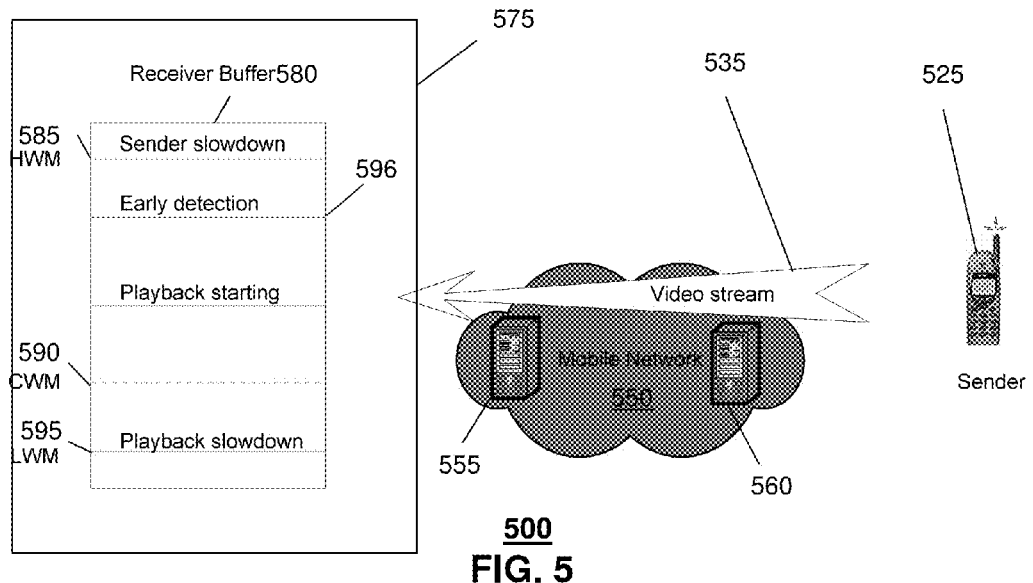
FIGS. 5-6 depict illustrative embodiments of systems that perform video service buffer management.

Referring to FIG. 5, a system 500 is illustrated for providing media services including the delivery of media content such as video content. In this example, a communication device 525 can provide the video content via a video stream 535 over a network 550 to a receiving or recipient communication device 575 having a video buffer 580. The exemplary embodiments can include the communication device 525 being various types of devices including mobile devices, fixed devices, servers, network elements (such as a media gateway) and so forth. The exemplary embodiments can include the network 550 being various types of networks including one or more of mobile networks, interactive television networks, IMS networks, combinations thereof, and so forth. The video stream 535 can be of various types that is generated and encoded based on various protocols, including Real-time Streaming Protocol, Real-time Transport Protocol and/or Real-time Transport Control Protocol. As an example, audio data associated with the stream 535 can be compressed using MP3, Vorbis or AAC while video data is compressed using H.264 or VP8. Continuing with this example, the encoded stream(s) 535 can be assembled in a container using FLV, WebM, ASF or ISMA, and the bitstream can be delivered utilizing a transport protocol, such as MMS or RTP. Further to this example, MMS or RTSP can enable the receiving communication device 575 to interact with the device 525 or other streaming device (e.g., a streaming server such as source 130 of FIG. 1). Other protocols, such as UDP, HTTP and/or TCP can be utilized for the delivery and/or control of the video stream 535. The particular protocol(s) being utilized by system 500 for the delivery of the video stream 535 can vary based on a number of factors, including one or more of the device capabilities, network conditions, network element compatibility, type of media content being delivered, quality of service requirements, user preferences, and so forth.

In one embodiment, system 500 can employ Mobile Rate Control (MRCE) at least at the video service application layer to enable the video stream sender or other control source to adaptively set a desired video encoding bit rate on the fly, such as adaptive to a network's changing condition. This can allow a user at the receiving device 575 to achieve an improved quality perception of the video communication. In one embodiment, the encoding rate can be directly linked to the required data transmission rate for a fixed frame rate in a video application or content. The higher the encoding rate, the faster transmission may take place in this example. However, the exemplary embodiments can also be utilized with a system that employs a variable or adjustable frame rate.

System 500 can provide for buffer management that supports a transmission rate change (e.g., an increase or decrease) in the event of an application layer desired encoding rate change (e.g., an increase or decrease). System 500 can also mask out video performance impacting factors, such as jitter and latency, caused by an erroneous radio link and its speed variation due to handoff events.

The video buffer 580 can have a number of parameters including a total buffer size, a Low watermark (LWM) 595 that indicates the buffer 580 is near empty, a Current watermark (CWM) 590 that indicates the current buffer level where the LWM<CWM<HWM, a High watermark (HWM) 585 that indicates that the buffer is almost full, and/or a playback starting time (e.g., at 50% HWM 585 the device can start rendering video).

In one embodiment, the buffer capacity or size can be a fixed capacity. In another embodiment, the HWM 585 can be determined by the receiving device 575 based on a number of factors, including parameters for the video content being transmitted, a subject matter of the video content, and/or parameters associated with the receiving device. The receiving device 575 can determine the subject matter utilizing a number of different techniques, including querying a database or other source for such information, analyzing metadata associated with the video content (e.g., metadata that accompanies the video content or is otherwise accessed). In one embodiment, when the video buffer reaches or passes the HWM 585, the receiving device 575 can adjust playback to preserve capacity in the video buffer such as increasing the frame rate of the playback. In another embodiment, the receiving device 575 can remove particular frames from the video buffer, which has a similar but opposite effect to duplicating the frames as is discussed later herein. The removal of frames can be based on selecting frames that can be removed without impacting or with a reduced impact on the quality of viewing. This can include selection of frames based on a degree of similarity to a previous or subsequent frame. In one embodiment, the degree of similarity can be determined based on metadata or a compression technique. In another embodiment, if the video content is of a subject matter that will not be greatly impacted by removing a number of frames then the receiving device 575 can utilize this technique.

In one embodiment, the receiving device 575 can provide buffer status information to the device 525 or another device that controls transmission rate and/or encoding rate for the video stream 535. The buffer status information provided by the receiving device 575 can include various data, such as the total buffer size, and/or the current used and/or unused capacity of the video buffer 580. In one or more embodiments, the receiving device 575 can periodically provide the buffer status information. The period for transmission can be static and/or can be dynamic, such as based on criteria associated with the vide buffer 580 (e.g., passing one or more of the HWM 585, the CWM 590 and the LWM 595). In another embodiment, the communication device 525 can query the receiving device 575 for the buffer status information. It should be understood that the amount of data stored in the video buffer 580 can increase or decrease depending on the amount of data being received and the amount of data being removed for presentation. Discussion herein of passing a threshold can be based on falling below the threshold or can be based on rising above the threshold.

In one embodiment, an early detection point 596 of the video buffer 580 can be designated so that the network conditions can be determined at this point. For example, the communication device 525 can determine that that video buffer 580 has reached the early detection point 596 based on buffer status information received from the receiving device 575. In response to this determination by the communication device 525, network conditions can be obtained, such as via transmitting queries to a monitoring server 555 and/or transmitting queries directly to one or more network elements 560 (e.g., routers, switches and so forth). In one embodiment, the monitoring server 555 and/or the network elements 560 can periodically provide the communication device 525 with the network conditions, such as responsive to detecting initiation of the video stream 535 (which may pass through the particular network element(s) 560) or responsive to a request for periodic updates received from the device 525. The particular network conditions that are obtained can vary and can include, network traffic or load, a history of network load corresponding to a transmission time for the video stream 535, and/or an identification of network element failure(s) that may impact the network. In one embodiment, the receiving device 575 can obtain the network conditions based on the video buffer 580 reaching or passing the early detection point 596. In one embodiment, the receiving device 575 can monitor the network conditions to adjust the presentation of the media content, such as in anticipation of an adjustment that will be made by the communication device 525 based on the network conditions. In another embodiment, the receiving device 575 can transmit the network conditions to the communication device 525.

The particular value of the early detection point 596 with respect to the capacity of the video buffer 580 can be static or dynamic, and can be based on a number of factors. For example, a static value of 75% of the HWM 585 can be utilized for the early detection point 596. In one embodiment, this can be a default value (or another default value can be utilized) for the early detection point 596, and the receiving device 575 and/or the communication device 525 can dynamically adjust the early detection point value based on a number of the factors that can include one or more of a type of media content, network conditions, time of day, device capabilities, communication protocols being utilized, quality of service requirements, and so forth.

In one embodiment, when the video buffer 580 reaches the HWM 585, the communication device 525 can slow down or temporarily stop transmitting the video stream 535. In one embodiment, when the video buffer 580 reaches the LWM 595, the receiving device 575 can slow down the playback of the media content, such as utilizing a lower frame rate to delay buffer starvation and/or inserting duplicate frames (e.g., generated by the receiving device 575) into the video buffer 580 so that the frame rate can be maintained at the same rate but the video buffer does not empty. In one embodiment, the video buffer 580 can utilize a buffer size that is greater than the RNC Handoff Time and SGSN Handoff Time. In another embodiment, the receiving device 575 can utilize values of the watermarks such that (HWM 585-CWM 590)/Typical data speed is greater than the time RAN takes to bump-up the radio resource. In one embodiment, the video buffer 580 can be small enough to minimize the playback starting time but large enough to mask some impact from latency and jitter associated with the video stream 535. The particular values selected for the HWM 585 and the LWM 595 can vary including be static or dynamic, and can be based on a number of factors, including one or more of a type of media content, network conditions, time of day, device capabilities, communication protocols being utilized, quality of service requirements, and so forth.

In one embodiment, a playback start time can be determined by one or both of the communication device 525 and the receiving device 575. The playback start time can be based on a number of factors including, a type of media content, network conditions, time of day, device capabilities, communication protocols being utilized, quality of service requirements, user preferences, buffer status information, buffer operational parameters and so forth. In one embodiment, the receiving device 575 can obtain network conditions in conjunction with requesting the video stream 535 and can determine the playback start time based on the network conditions. In another embodiment, a default value can be provided for the playback start time which may or may not be adjustable by the receiving device 575 and/or the communication device 525.

System 500 can enable injecting additional criteria for the buffer design to work with lower layers such as radio network resource management. The system 500 can allow network assignment of proper radio resources for the video communication, thus making MRC more effective. In one embodiment, if the video application layer increases the encoding rate while the radio network is not ready to speed up the transmitting rate, the application layer can back off the rate increase.

Figure 6:
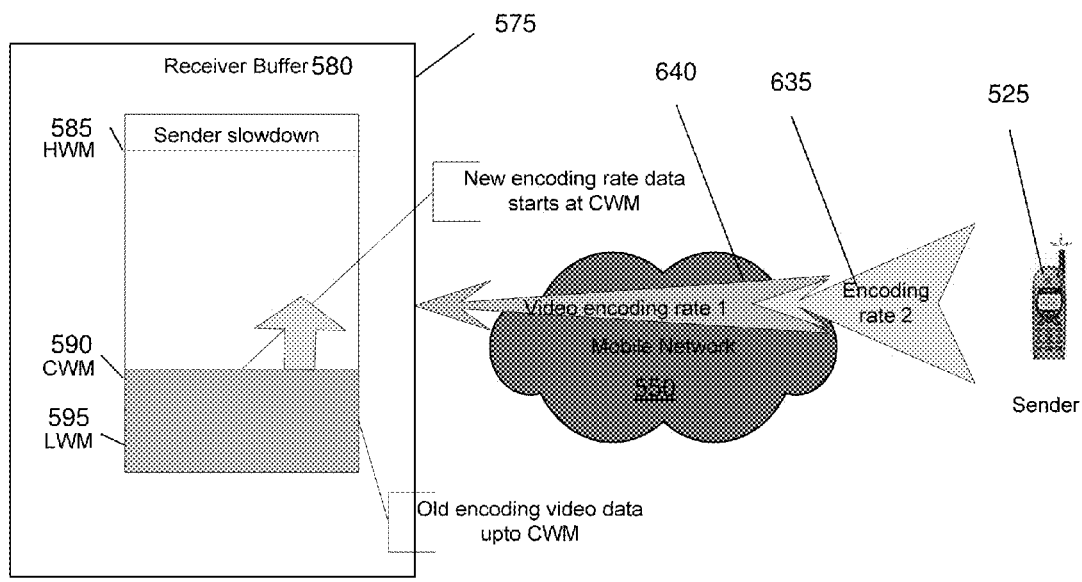

Referring to FIG. 6, a system 600 is illustrated for providing media services including the delivery of media content such as video content. In this example, the communication device 525 can provide the video content via a video stream over the network 550 to the receiving or recipient communication device 575 having a video buffer 580. This system 600 illustrates the adjustment to the video encoding rate from rate 1 to rate 2 and its impact of the video buffer 580. In one embodiment, adjustments to the video encoding rate can be performed in conjunction with adjustments to the transmission rate from the communication device 525 to the receiving device 575. In another embodiment, the transmission rate and encoding rate adjustments can be independent of each other. In another embodiment, the transmission rate and the encoding rate can be adjusted at different times. As an example, the encoding rate may be increased in anticipation of a transmission rate increase that has not yet gone into effect. Continuing with this example, the communication device 525 may determine that it will be able to increase the transmission rate of a video stream in the near future due to an anticipated change in the network conditions (e.g., another network element coming online or a network bottle neck being relieved), however, the amount of the anticipated transmission rate may be much higher than an encoder can handle. In this example, the encoder may increase its encoding rate prior to the transmission rate increase so that the communication device 525 will have a sufficient amount of encoded data to transmit (e.g., stored in an encoder buffer which is not shown). Continuing with this example, if the encoder buffer falls to a low water mark then the communication device can decrease the transmission rate based on the encoding rate.

Figure 7:
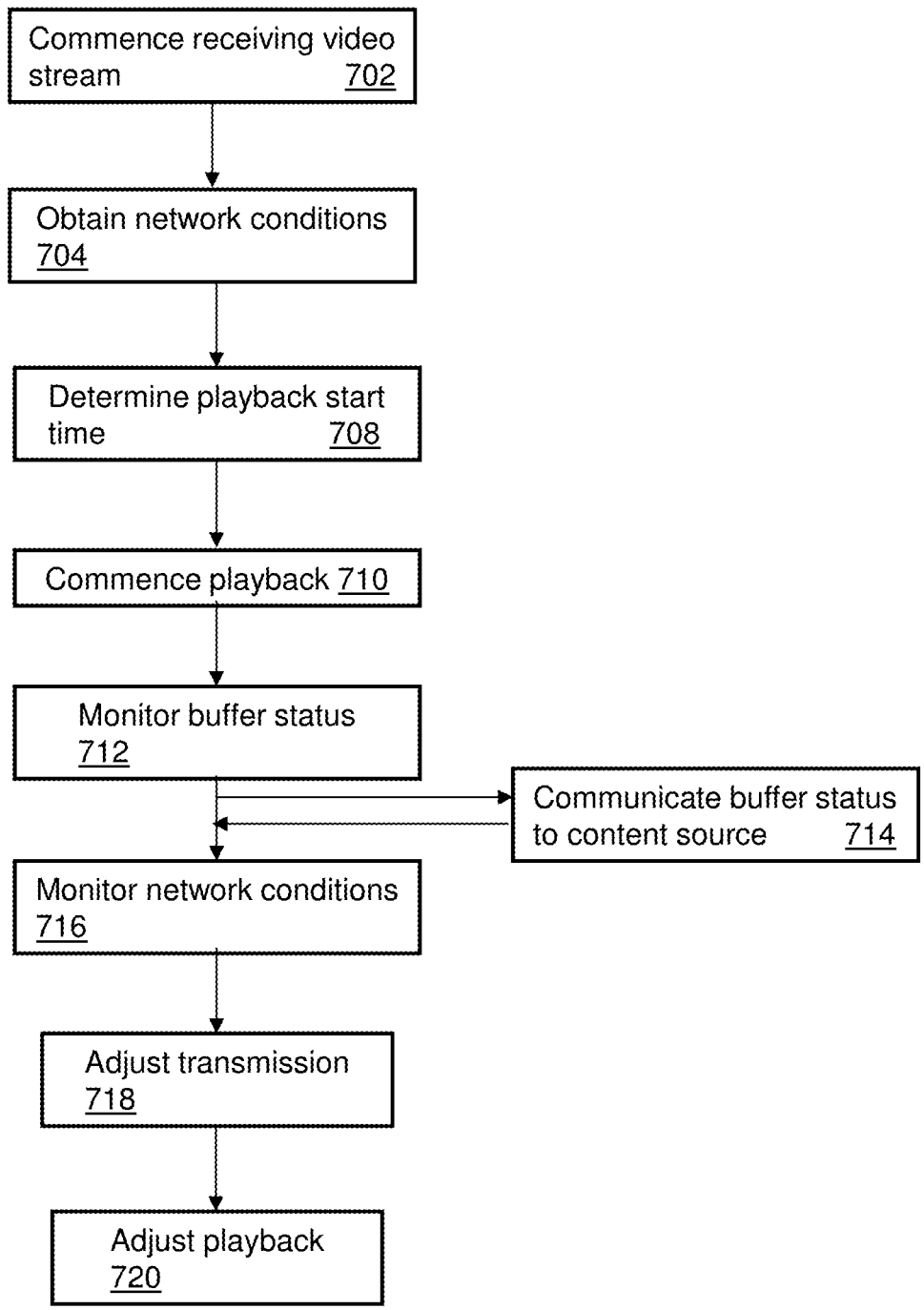
FIG. 7 depicts an illustrative embodiment of a method operating in portions of the systems described in FIGS. 1-6.

FIG. 7 depicts an illustrative method 700 that operates in portions of the devices of FIGS. 1-6. Method 700 can begin with step 702 in which the receiving device (e.g., receiving device 525 of FIG. 5) receives video content over a network from a content source device (e.g., source device 575 of FIG. 5). The receiving device can begin storing the video content in the video buffer. In step 704, network conditions can be obtained by one or both of the receiving and source devices. In one embodiment, the network condition information can be exchanged between the receiving device and the source device to reduce duplication of tasks.

In step 708, a playback start time can be determined. The playback start time can be determined by one or both of the receiving and source devices. The playback start time can be determined based on a number of factors, including one or more of network conditions, video buffer status, video buffer operational parameters, type of video content, user preferences, operational parameters of one or both of the receiving and source devices, and so forth. In step 710, the presentation of the media content can commence based on the determined playback start time.

In step 712, the video buffer status can be monitored by one or both of the receiving and source devices. In one embodiment, the receiving device can gather the video buffer status information and transmit it to the source device as in step 714. In step 716, network conditions can be monitored by one or both of the receiving and source devices. The network conditions can include various information, such as a network status, a network load, a history of network load corresponding to a transmission time for the video content, and/or an identification of a network element failure(s). Other network conditions can also be monitored, including conditions associated with the video stream such as latency, jitter, signal-to-noise ratio, dropped packets, and so forth.

In one embodiment, network status can be retrieved from a network monitoring device that collects performance data with respect to some or all of the network elements of the network. In one embodiment, the performance data can be analyzed for the network elements associated with a transmission path for the video stream to predict or estimate an undesired condition for the delivery of the video stream. For example, the prediction can be based on monitoring a rate of increased use of the network elements along the path. The rate can be sued to determine if one or more of the network elements will reach a resource usage capacity. In another embodiment, the performance data of the network elements along the transmission path for the video stream can be compared to performance data for other network elements that could alternatively be used for transmitting the video stream. This analysis or comparison can be utilized to determine if a new path can be established that enables transmission rate increases.

In one embodiment, historical performance information can be maintained to estimate or predict changes to the network status. For example, a historical load increase may be determined for delivery of media content on Fridays at 8 p.m. In one embodiment, this historical information can be used by the content source to increase transmission rate of the video content prior to 8 p.m. in anticipation of a needed slowdown at 8 p.m.

In step 718, the transmission rate for the video stream can be adjusted by the source device, such as shown in FIG. 6. The transmission rate adjustment can be based on a number of factors, including one or more of the video buffer status (e.g., a capacity of the video buffer and an amount of the capacity that has been utilized), the network conditions, receiving and/or source device capabilities, protocols being utilized, user preferences, content type, and so forth. As an example, the source device can reduce or stop transmitting the video content via the video stream upon detection that the video buffer has reached a high water mark that is indicative of the video buffer being filled in the near future.

In step 720, the receiving device can adjust the playback of the video content. For example, the receiving device can monitor for a buffer exhaustion condition based on the buffer status information, where the buffer exhaustion condition is a determination that the video buffer has fallen below a minimum threshold prior to the receiving device having all of the video content. The receiving device can adjust the playback of the video content responsive to a detection of the buffer exhaustion condition. In one embodiment, the receiving device can adjust the playback by reducing a frame rate of the video content. By reducing the frame rate, the receiving device will be removing data from the video buffer at a slower rate which may enable the video buffer to avoid the buffer exhaustion condition. In one embodiment, the frame rate can be slowed until the video buffer reaches a desired threshold (e.g., increases video data above to ma designated point above the low water mark) at which time the frame rate can be returned to its default value. In another embodiment, the playback can be adjusted by generating duplicate frame and inserting the duplicate frames into the video buffer. For instance, the receiving device can begin copying each frame and inserting the copied frame adjacent to the original frame in the video buffer. In this way, the frame rate can be maintained at the same value while duplicate frames are being presented in succession by the display of the receiving device. It should be understood that the duplicate frames can be exact duplicates or can be partial duplicates, such as copying only pixels that are deemed significant. It should be further understood that the number of duplicate frames can be a single duplicate for each original frame or multiple duplicates for each original frame. The number of duplicates can be based on a number of factors, including the amount of playback adjustment needed to avoid video buffer exhaustion, the type of video content, the resolution and/or other parameters associated with each of the frames, and so forth. In one embodiment, a combination of frame rate adjustment and duplication of frames can be utilized to enable the video buffer to avoid video buffer exhaustion.

The steps described in method 700 can be repeated, in order or out of order, so that the user can view the video content without interruption. Method 700 enables video buffer management to efficiently deliver video content while also accounting for undesired conditions associated with various events, including network conditions, video buffer exhaustion, latency, jitter, and so forth.

Upon reviewing the aforementioned embodiments, it would be evident to an artisan with ordinary skill in the art that said embodiments can be modified, reduced, or enhanced without departing from the scope and spirit of the claims described below. For example, a history of trick play functions (e.g., pause, rewind, fast forward) may be obtained (e.g., via monitoring at the receiving device 575) and utilized for adjustments to one or more of the transmission rate or playback, or playback start time and/or for defining watermarks for the video buffer. As an example, a user that has a history of rewinding video content may not need as much data in the video buffer since it will likely take the user a longer period of time to present all of the video content while a user with a history of fast forward video content may need more data in the buffer since this user may consume the video content quicker. In another embodiment, the content source (e.g., source 130 or communication device 525) may switch between versions of the video content being streamed in order to deliver more or less of the content as desired. For example, to increase the amount of video content being delivered to the video buffer, the source can switch to a version of the video content that has less error correction data and/or a lower resolution so that the video buffer of the receiving device can fill up faster. The switching of versions of the content can be utilized with or without adjusting a transmission rate for the content. Other embodiments are contemplated by the subject disclosure.

In one embodiment, original frames that are selected for duplication and/or removal can be selected by the receiving device 575 based on an analysis performed by the receiving device of the video content. This analysis and selection of frames can be performed without utilizing metadata or other information from another source, such as the content source, that indicates frames for duplication and/or removal. In another embodiment, metadata or other information indicating frames for duplication and/or removal can be received by the receiving device 575 and utilized in the duplication and/or removal selection process.

In one embodiment, the buffer status information can be provided by the receiving device to the content source device based on polling or requests from the content source device. In another embodiment, the receiving device can establish or obtain a schedule for providing the periodic buffer status information to the content source device.

Figure 8:
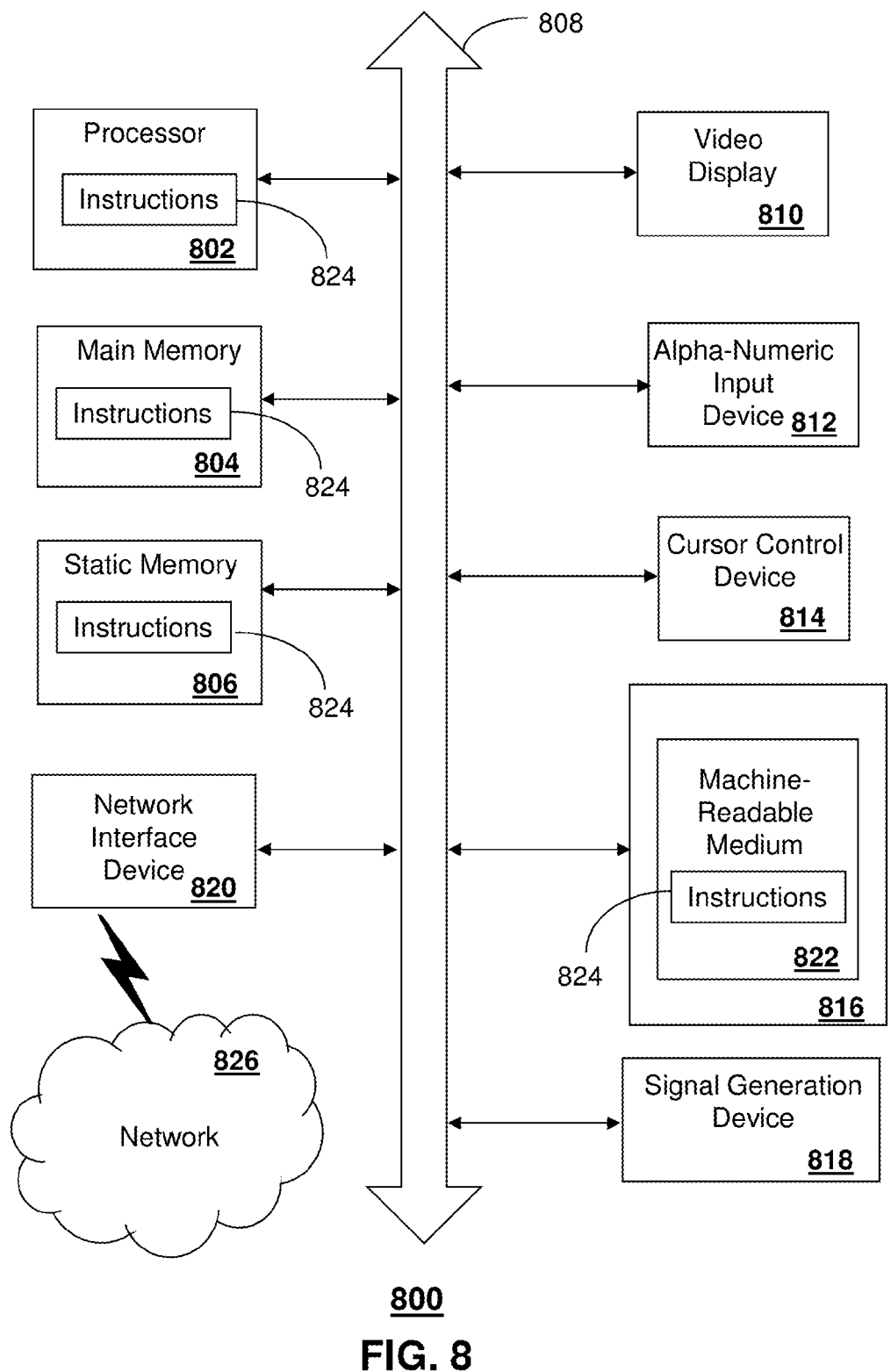
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the source 130, media processor 106, mobile device 116, communication device 525, receiving device 575 and other devices of FIGS. 1-6. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device comprising:
a memory storing computer instructions; and
a processor coupled with the memory, wherein the processor, responsive to executing the computer instructions, performs operations comprising:
receiving video content over a network from a content source device;
providing the video content to a video buffer of the communication device, wherein the video buffer has a video capacity including a fixed capacity;
obtaining network condition information representing a network status;
determining a playback start time based on the network condition information;
commencing playback of the video content based on the playback start time;
determining a high mark for usage of the video capacity based on parameters associated with the video content and the communication device;
periodically communicating buffer status information to the content source device to enable the content source device to adjust a transmission rate for the video content being received by the communication device based on the buffer status information and the network status, wherein the buffer status information represents the fixed capacity of the video buffer, an amount of the capacity that has been utilized, and the high mark for the video buffer;
monitoring for a buffer exhaustion condition based on the buffer status information, wherein the buffer exhaustion condition comprises a determination that the video buffer has fallen below a minimum threshold prior to the processor receiving all of the video content; and
adjusting the playback of the video content responsive to a detection of the buffer exhaustion condition.

2. The communication device of claim 1, wherein the processor, responsive to executing the computer instructions, performs operations comprising:
monitoring for a buffer overflow condition based on the buffer status information, wherein the buffer overflow condition comprises a determination that the video buffer has risen above the high mark; and
responsive to a detection of the buffer overflow condition, adjusting the playback of the video content by removing target frames from a group of frames of the video content stored in the video buffer, wherein each of the target frames is selected based on a degree of similarity of the target frame to a previous or subsequent frame.

3. The communication device of claim 1, wherein the periodic communicating of the buffer status information to the content source device is based on polling received from the content source device, wherein the adjusting of the playback comprises reducing a frame rate for the video content during the playback, and wherein a subject matter of the video content is determined by the processor based on metadata associated with the video content.

4. The communication device of claim 3, wherein the minimum threshold is based on one of a time period or a number of video frames prior to reaching the buffer exhaustion condition, and wherein the processor, responsive to executing the computer instructions, performs operations comprising:
determining an amount for the reducing of the frame rate based on the minimum threshold and an amount of a remaining portion of the video content to be received by the communication device.

5. The communication device of claim 1, wherein the adjusting of the playback comprises:
utilizing the processor for generating duplicated frames from original frames of the video content, wherein the original frames selected for duplication are based on an analysis of the original frames performed by the processor without receiving metadata indicating frames for duplication; and
inserting the duplicated frames with the original frames in the video buffer.

6. The communication device of claim 5, wherein the minimum threshold is based on one of a time period or a number of video frames prior to reaching the buffer exhaustion condition, and wherein the processor, responsive to executing the computer instructions, performs operations comprising:
determining an amount of the duplicated frames based on the minimum threshold and an amount of a remaining portion of the video content to be received by the communication device.

7. The communication device of claim 1, wherein the adjusting of the transmission rate is based on satisfying a threshold associated with the video buffer, wherein the threshold is based on one of a time period or a number of video frames.

8. The communication device of claim 1, wherein one of the communication device or the content source device is a mobile device that enables voice communications, and wherein a schedule for the periodic communicating of the buffer status information to the content source device is determined by the processor.

9. The communication device of claim 1, wherein the network status comprises one of a network load, a history of network load corresponding to a transmission time for the video content, or an identification of a network element failure.

10. A method, comprising:
receiving video content at a communication device, wherein the video content is received over a network from a content source device;
providing, by the communication device, the video content to a video buffer of the communication device;
commencing, by the communication device, playback of the video content at a start time determined based on a network status;
determining buffer status information that represents a capacity of the video buffer and an amount of the capacity that has been utilized, the buffer status information being determined by the communication device;
monitoring for a buffer exhaustion condition based on the buffer status information, wherein the buffer exhaustion condition is monitored by the communication device and comprises a determination that the video buffer will fall below a minimum threshold prior to the communication device receiving all of the video content, wherein the minimum threshold is based on one of a time period or a number of video frames;
adjusting the playback of the video content responsive to a detection of the buffer exhaustion condition, wherein the adjusting of the playback is performed by the communication device and comprises:
selecting original frames for duplication,
generating duplicated frames from the original frames, and
inserting the duplicated frames with the original frames in the video buffer; and
determining an amount of the duplicated frames based on one of the minimum threshold, a network status or an amount of a remaining portion of the video content to be received by the communication device.

11. The method of claim 10, comprising:
utilizing the communication device for obtaining network condition information representing the network status, wherein the selecting of the original frames is based on analysis of the video content performed by the communication device without receiving information indicating frames to be duplicated.

12. The method of claim 11, wherein the network status comprises one of a network load, a history of network load corresponding to a transmission time for the video content, or an identification of a network element failure.

13. The method of claim 10, comprising:
communicating the buffer status information to the content source device to enable the content source device to adjust a transmission rate for the video content being received by the communication device based on the buffer status information.

14. The method of claim 10, wherein one of the communication device or the content source device is a mobile end user device that enables voice communications.

15. A non-transitory computer-readable storage medium comprising computer instructions which, responsive to being executed by a processor, cause the processor to perform operations comprising:
commencing encoding video content to generate encoded video content;
commencing transmitting the encoded video content from the processor over a network to a communication device;
obtaining network condition information representing a current network status and a historical network status;
receiving buffer status information from the communication device, wherein the buffer status information represents a capacity of a video buffer of the communication device and an amount of the capacity that has been utilized by the communication device; and
adjusting a transmission rate and an encoding rate for the video content being transmitted to the communication device by the processor based on the buffer status information and the network condition information,
wherein the historic network status comprises a history of network load corresponding to a transmission time for the video content, and
wherein the adjusting of the transmission and encoding rate comprises:
an increase in the transmission and encoding rate responsive to a prediction of an upcoming increase in network load; and
responsive to a detection of an increase in network load, a decrease in the transmission and encoding rate.

16. The non-transitory computer-readable storage medium of claim 15, wherein the current network status comprises a network load.

17. The non-transitory computer-readable storage medium of claim 15, wherein the current network status comprises an identification of a network element failure.

18. The non-transitory computer-readable storage medium of claim 15, wherein the adjusting of the transmission rate comprises:
- monitoring for a buffer exhaustion condition based on the buffer status information, wherein the buffer exhaustion condition comprises a determination that the video buffer of the communication device will be empty prior to the communication device receiving all of the video content; and
- reducing the transmission rate responsive to a detection of the buffer exhaustion condition, wherein the reducing of the transmission rate is commenced based on satisfying a threshold associated with reaching video buffer exhaustion, and wherein the threshold is based on one of a time period or a number of video frames prior to the video buffer exhaustion.

\* \* \* \* \*